United States Patent [19]

Nambu et al.

[11] Patent Number: 5,498,666
[45] Date of Patent: Mar. 12, 1996

[54] CURABLE COMPOSITION SUITABLE AS TOP COAT

[75] Inventors: Toshiro Nambu; Masaharu Inoue; Seigo Nakamura; Hisao Furukawa, all of Kobe, Japan

[73] Assignee: Kanegafuchi Kagaku Kogyo Kabushiki Kaisha, Osaka, Japan

[21] Appl. No.: 278,340

[22] Filed: Jul. 21, 1994

[30] Foreign Application Priority Data

Jul. 22, 1993 [JP] Japan ................................. 5-181597

[51] Int. Cl.$^6$ ............................................................ C04L 83/06
[52] U.S. Cl. ........................................... 525/100; 525/102
[58] Field of Search ..................................... 525/100, 102

[56] References Cited

U.S. PATENT DOCUMENTS 5,344,880  9/1994  Nambu et al. ........................ 525/100

FOREIGN PATENT DOCUMENTS 400303  12/1990  European Pat. Off. .

Primary Examiner—Ralph H. Dean
Attorney, Agent, or Firm—Varndell Legal Group

[57] ABSTRACT

A curable composition suitable as top coats having an improved excellent acid resistance as well as excellent properties such as thermosetting property, appearance, water resistance, scratch resistance and weatherability, which comprises (A) a vinyl copolymer having a main chain substantially composed of a vinyl copolymer and having in its molecule both at least one hydrolyzable silyl group and at least one alcoholic hydroxyl group, (B) a silanol group-containing organopolysiloxne having at least one silanol group, and (C) a curing catalyst.

13 Claims, No Drawings

CURABLE COMPOSITION SUITABLE AS TOP COAT

BACKGROUND OF THE INVENTION

The present invention relates to a curable composition for top coating, and more particularly to a curable composition which has an improved excellent acid resistance in addition to excellent other properties such as water resistance, scratch resistance, appearance and thermosetting property and which is suitable as top coat for interior and exterior of buildings and for various articles such as automobiles, industrial equipments, steel furnitures, household electric appliances and plastic products, particularly suitable as top coat for automobiles.

Paints containing a melamine resin such as alkyd-melamine resin or acrylic melamine have hitherto been mainly used for coating automobiles, interior and exterior of buildings, industrial equipments, steel furnitures, plastic products and the like. However, these melamine resins involve the problems that harmful formalin generates when curing the paints, and that the cured coating films are damaged by acid rain because they are poor in acid resistance. In particular, the problem of acid rain resulting from air pollution assumes a serious aspect in recent years, and there is observed a phenomenon that etching, whitening or spotting occurs in the coating films.

It is known that vinyl copolymers having a hydrolyzable silyl group or their blends with acrylic polyols are curable and useful for the production of paints having a good acid resistance and a good weatherability, for instance, as disclosed in Japanese Patent Publication Kokai No. 54-36395, No. 58-157810 and No. 01-141952.

These polymers or polymer blends have the feature that since hydrolyzable silyl groups and alcoholic hydroxyl groups form stable siloxane bonds or siloxy bonds to cure, there can be formed coating films having good acid resistance and weatherability as compared with melamine resins such as acrylic melamine resin and alkyd melamine resin. Further, when the hydrolyzable silyl groups are those shown by the formula (II):

wherein $R^3$ is an alkyl group having 1 to 10 carbon atoms, $R^4$ is H or a monovalent hydrocarbon group selected from an alkyl group having 1 to 10 carbon atoms, an aryl group or an aralkyl group, and b is 0, 1 or 2, the coating films are particularly superior in acid resistance and weatherability, since the hydrolyzable silyl groups are introduced into the polymer main chain through Si-C bond.

The blend systems of a hydrolyzable silyl group-containing vinyl copolymer and an acrylic polyol have the advantages, as compared with the use of the vinyl copolymer alone, that the thermosetting property and appearance of the obtained films are better and that reduction of cost for preparing curable coating compositions is possible because the amount of a compound having a hydrolyzable silyl group which relatively expensive raw material, can be reduced. However, these blend systems are not always satisfactory in water resistance and acid resistance. Further, in order to achieve a good compatibility between the hydrolyzable silyl group-containing vinyl copolymer and the acrylic polyol, the molecular weights of the respective polymers, the composition of monomers and the blending ratio of the polymers are somewhat restricted.

In order to solve these problems, it is proposed to use a vinyl copolymer having both a hydrolyzable silyl group and an alcoholic hydroxyl group in the same molecule, e.g. a copolymer of a vinyl monomer having a hydrolyzable silyl group and a vinyl monomer having an alcoholic hydroxyl group. When this polymer is used in paints, the water resistance and acid resistance of coating films are improved to some extent. However, further improvement in acid resistance is demanded, since in recent years occurrence of spot in coatings owing to acid rain is in question in North America and Europe and particularly since coatings of automobiles suffers damage from acid rain.

It is an object of the present invention to provide a curable resin composition having an improved excellent acid resistance.

A further object of the present invention is to provide a coating composition, particularly a coating composition suitable as a top coat which has excellent properties such as acid resistance, water resistance, appearance, weatherability, abrasion resistance, scratch resistance, thermosetting property and other properties required for coatings.

These and other objects of the present invention will become apparent from the description hereinafter.

SUMMARY OF THE INVENTION

It has been found that when the vinyl copolymer having both a hydrolyzable silyl group and an alcoholic hydroxyl group in its molecule is used in combination with a compound having at least one silanol group, particularly a silanol group-containing organopolysiloxane, the acid resistance is improved without substantially impairing other properties such as thermosetting property, appearance and the like.

In accordance with the present invention, there is provided a curable composition suitable as a top coat, which comprises:

(A) a vinyl copolymer having a main chain consisting essentially of a vinyl copolymer and having in its molecule both at least one alcoholic hydroxyl group and at least one hydrolyzable silyl group, bonded to a carbon atom, of the formula (I):

wherein $R^1$ is an alkyl group having 1 to 10 carbon atoms or an aryl group, $R^2$ is hydrogen atom or a monovalent hydrocarbon group selected from the group consisting of an alkyl group having 1 to 10 carbon atoms, an aryl group and an aralkyl group, and a is 0, 1 or 2, said copolymer having an alcoholic hydroxyl equivalent of 400 to 2,000 g, (B) 1 to 200 parts of a silanol group-containing organopolysiloxane having at least one silanol group, and (C) 0.001 to 10 parts of a curing catalyst, said parts of (B) and (C) being parts by weight per 100 parts by weight of said vinyl copolymer (A).

The curable composition according to the present invention has an excellent thermosetting property and provides coating films having an excellent acid resistance as well as excellent other properties such as water resistance, scratch resistance and appearance.

DETAILED DESCRIPTION

The vinyl copolymer (A) used in the present invention is a polymer having a main chain substantially composed of a copolymer of vinyl compounds. The vinyl copolymer (A)

has at a main chain end and/or a side chain at least one hydrolyzable silyl group, bonded to a carbon atom, of the formula (I):

wherein $R^1$ is an alkyl group or an aryl group, $R^2$ is H or a monovalent hydrocarbon group, and a is 0, 1 or 2. The vinyl copolymer (A) also has at least one alcoholic hydroxyl group at a main chain end and/or a side chain, and the alcoholic hydroxyl equivalent of the copolymer (A) is from 400 to 2,000 g.

The hydrolyzable silyl group (I) is included in the vinyl copolymer (A) in the state that the silicon atom to which a hydrolyzable group is bonded, is bonded to a carbon atom to form Si—C bond. Since the hydrolyzable silyl group (I) is introduced directly or indirectly through Si—C bond to the end of the main chain of the copolymer and/or to the side chain or as the side chain, the vinyl copolymer (A) provides coating films having good acid resistance and weatherability. Since the vinyl copolymer (A) also has an alcoholic hydroxyl group at the main chain end and/or the side chain together with the hydrolyzable silyl group, it provides coating films having good acid resistance and weatherability as compared with a vinyl copolymer having only a hydrolyzable silyl group without an alcoholic hydroxyl group or a blend system composed of such a vinyl copolymer and an acrylic polyol.

Further, in the present invention, the vinyl copolymer (A) incorporated with the silanol group-containing organopolysiloxane (B). Crosslinking of the copolymer (A) can proceed by directly causing condensation reaction between the hydrolyzable silyl group of the vinyl copolymer (A) and the silanol group of the organopolysiloxane (B) without passing through a hydrolysis reaction of the hydrolyzable silyl group which requires water or moisture. It is considered that crosslinking based on such a condensation reaction may produce uniform cured coating films, and the condensation reaction of the hydrolyzable silyl group and the silanol group introduces siloxane bonds, which are very stable, into the cured products, whereby the acid resistance is remarkably improved.

In the formula (I), $R^1$ is an alkyl group having 1 to 10 carbon atoms, preferably 1 to 4 carbon atoms, such as methyl group, ethyl group, propyl group or butyl group, or an aryl group, preferably an aryl group having 6 to 10 carbon atoms, such as phenyl group. $R^2$ is hydrogen atom or a monovalent hydrocarbon group. The monovalent hydrocarbon group for $R^2$ is selected from an alkyl group having 1 to 10 carbon atoms, preferably 1 to 4 carbon atoms, such as methyl group, ethyl group, propyl group or butyl group; an aryl group, preferably an aryl group having 6 to 25 carbon atoms, such as phenyl group; and an aralkyl group, preferably an aralkyl group having 7 to 12 carbon atoms, such as benzyl group.

Representative examples of the hydrolyzable silyl group (I) are those included in hydrolyzable silyl group-containing vinyl monomers mentioned after.

The alcoholic hydroxyl equivalent of the vinyl copolymer (A), which is shown by the weight (g) of the vinyl copolymer containing 1 gram equivalent of an alcoholic hydroxyl group, is from 400 to 2,000 g, preferably 500 to 2,000 g, more preferably 600 to 1,800 g. When the hydroxyl equivalent is less than 400 g, the acid resistance of the obtained coating films is liable to decrease. When the hydroxyl equivalent is more than 2,000 g, the thermosetting property of coating compositions and the scratch resistance and impact resistance of coating films are decreased.

From the viewpoints of good thermosetting property, acid resistance and weathrability, it is preferable that the hydrolyzable silyl equivalent of the vinyl copolymer (A), which is shown by the weight (g) of the vinyl copolymer containing 1 gram equivalent of a hydrolyzable silyl group, from 380 to 30,000 g, especially 410 to 3,000 g, more especially 450 to 1,500 g.

Further, from the viewpoints of good thermosetting property, acid resistance, weatherability and water resistance, it is preferable that the molar ratio of the alcoholic hydroxyl group to the hydrolyzable silyl group is from 0.1 to 3, especially 0.5 to 2.5, more especially 0.7 to 2. The desired molar ratio can be obtained, for instance, by adjusting the amounts of a hydrolyzable silyl group-containing vinyl monomer and an alcoholic hydroxyl group-containing vinyl monomer used upon the preparation of the vinyl copolymer (A) mentioned below.

The vinyl copolymer (A) can be prepared, for example, by copolymerizing a vinyl monomer having the hydrolyzable silyl group (I) (hereinafter referred to as "hydrolyzable silyl group-containing vinyl monomer" or "monomer A1"), an alcoholic hydroxyl group-containing vinyl monomer (hereinafter referred to as "OH-containing monomer" or "monomer A2") and other monomers copolymerizable therewith having neither hydrolyzable silyl group nor hydroxyl group (hereinafter referred to as "monomer A3").

Typical examples of the monomer A1 are, for instance, a compound Of the formula (III):

wherein $R^1$, $R^2$ and a are as defined above, and $R^5$ is hydrogen atom or methyl group, e.g.

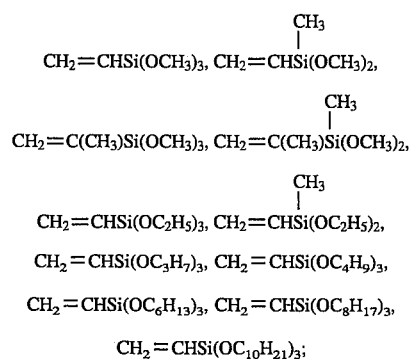

a compound of the formula (IV):

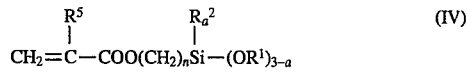

wherein $R^1$, $R^2$, $R^5$ and a are as defined above, and n is an integer of 1 to 12, e.g.

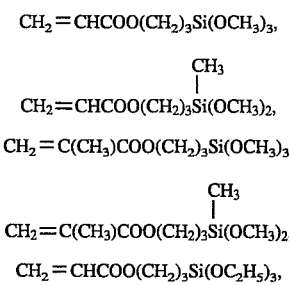

-continued

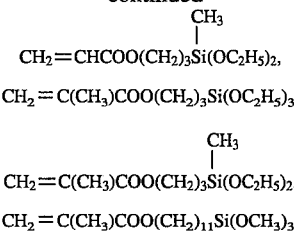

a compound of the formula (V):

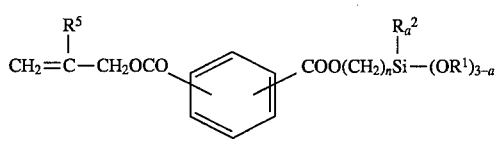

wherein $R^1$, $R^2$, $R^5$, a and n are as defined above, e.g.

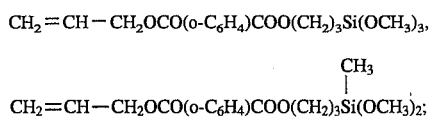

a compound of the formula (VI):

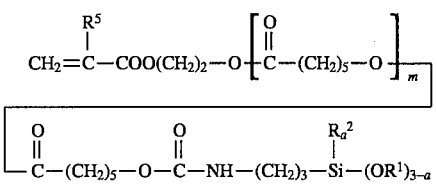

wherein $R^1$, $R^2$, $R^5$ and a are as defined above, and m is an integer of 1 to 14, especially 1 to 8, e.g.

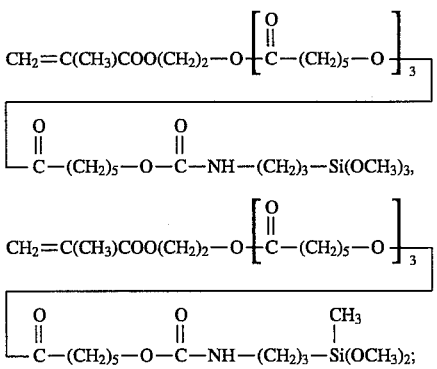

a compound of the formula (VII):

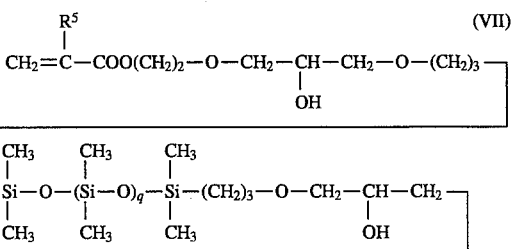

wherein $R^1$, $R^2$, $R^5$ and a are as defined above, and q is 0 or an integer of 1 to 20, e.g.

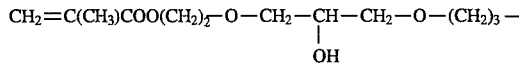

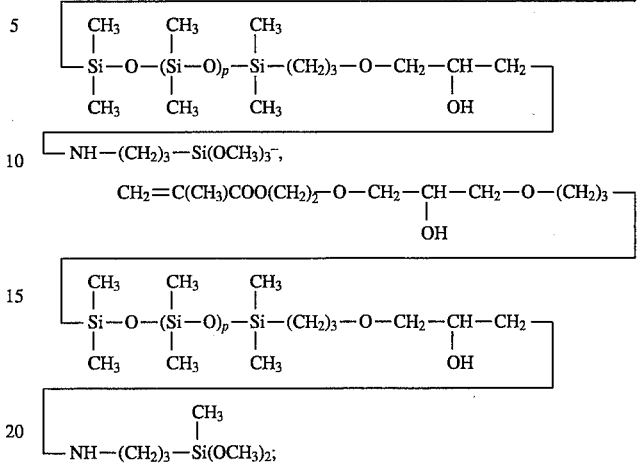

wherein p is 0 or an integer of 1 to 20; an acrylate or methacrylate having the hydrolyzable silyl group (I) at the molecular end through a urethane bond or a siloxane bond; and the like.

Among them, the acrylate or methacrylate compound (IV) is preferred, because of easiness in handling, low cost, no production of by-product and others.

The monomers A1 may be used alone or in admixture thereof.

The monomers A1 are used in an amount of 5 to 40% by weight, especially 10 to 35% by weight, based on the total weight of monomers used. When the amount of the monomer A1 is less than 5% by weight, the acid resistance of coating films formed from the obtained curable composition tends to be insufficient. When the amount of the monomer A1 is more than 40% by weight, the storage stability of the curable composition tends to lower.

Examples of the OH-containing monomer A2 are, for instance, a hydroxyalkyl acrylate or methacrylate such as 2-hydroxyethyl acrylate or methacrylate, 1-hydroxypropyl acrylate or metharylate or 2-hydroxypropyl acrylate or methacrylate; a hydroxyalkyl vinyl ether such as 2-hydroxyethyl vinyl ether; N-methylol acrylamide or methacrylamide; ARONIX M-5700 which is a product made by Toagosei Chemical Industry Co., Ltd.; 4-hydroxystyrene; an acrylic acid ester oligomer having a terminal hydroxyl group such as HE-10, HE-20, HP-1 or HP-20 which are products of Nippon Shokubai Co., Ltd.; a dihydric alcohol monoacrylate or monomethacrylate such as polypropylene glycol monomethacrylate (BLEMMER PP), polyethylene glycol monomethacrylate (BLEMMER PE), polyoxyethylene polyoxypropylene monomethacrylate (BLEMMER PEP), polypropylene glycol monoacrylate (BLEMMER AP-400), polyethylene glycol monoacrylate (BLEMMER AE-350), polyoxypropylenetrimethylene monoacrylate (BLEMMER NKH-5050) or glycerol monomethacrylate (BLEMMER GLM) wherein "BLEMMER" is a trade mark for the products of Nippon Oil and Fats Co., Ltd.; and an ε-caprolactone-modified hydroxyalkyl vinyl compound obtained by a reaction of a hydroxyl group-containing vinyl compound such as hydroxyalkyl acrylate, hydroxyalkyl methacrylate or hydroxyalkyl vinyl ether with ε-caprolactone.

Typical examples of the ε-caprolactone-modified hydroxyalkyl vinyl compound are compounds of the formula (VIII):

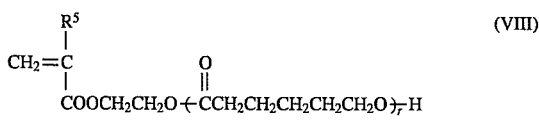

(VIII)

wherein $R^5$ is hydrogen atom or methyl group, and r is an integer of 1 or more, such as Placcel FA-1 ($R^5$=H, r=1 in the formula VIII), Placcel FA-4 ($R^5$=H, r=4 in the formula VIII), Placcel FM-1 ($R^5$=CH$_3$, r=1 in the formula VIII), Placcel FM-4 ($R^5$=CH$_3$, r=4 in the formula VIII), TONE M-100 ($R^5$=H, r=2 in the formula VIII), or TONE M-201 ($R^5$=CH$_3$, r=1 in the formula VIII) wherein "Placcel" is a trade mark for the products of Daicel Chemical Industries, Ltd. and "TONE" is a trade mark for the products of Union Carbide Corporation.

The OH-containing toohomers A2 may be used alone or in admixture thereof.

2-Hydroxypropyl acrylate or methacrylate, 2-hydroxyethyl acrylate or methacrylate and the ε-caprolactone-modified hydroxyalkyl vinyl compound, particularly 2-hydroxypropyl acrylate or methacrylate, are preferred as the monomer A2 from the viewpoints of good acid resistance and water resistance of coating films.

The OH-containing vinyl monomers A2 is used in an amount of 5 to 50% by weight, especially 7 to 35% by weight, based on the total weight of monomers used. When the amount of the toohomer A2 is less than 5% by weight, the curability tends to be insufficient. When the amount of the monomer A2 is more than 50% by weight, the acid resistance and water resistance of coating films tend to lower.

Examples of the other monomers A3 copolymerizable with the monomers A1 and A2 are, for instance, a (meth)acrylic acid derivative (the term "(meth)acrylic" or "(meth)acrylate" showing acrylic or acrylate and methacrylic or methacrylate, hereinafter the same), e.g. an alkyl (meth)acrylate such as methyl (meth)acrylate, ethyl (meth)acrylate, n-butyl (meth)acrylate, isobutyl (meth)acrylate, 2-ethylhexyl (meth)acrylate or stearyl (meth)acrylate, benzyl (meth)acrylate, cyclohexyl (meth)acrylate, a haloalkyl (meth)acrylate such as trifluoroethyl (meth)acrylate or pentafluoropropyl (meth)acrylate, perfluorocyclohexyl (meth)acrylate, acrylonitrile, methacrylonitrile, glycidyl (meth)acrylate, dimethylaminoethyl (meth)acrylate, diethylaminoethyl (meth)acrylate, (meth)acrylamide (acrylamide or methacrylamide, hereinafter the same), α-ethyl (meth)acrylamide, N,N-dimethyl (meth)acrylamide, N-methyl (meth)acrylamide, N-butoxymethyl (meth)acrylamide, a macromer such as "AS-6", "AN-6", "AA-6", "AB-6" or "AK-5" (which are commercially available from Toagosei Chemical Industry Co., Ltd. ), a phosphate group-containing vinyl compound such as a condensation product of a hydroxyalkyl ester of αβ-ethylenically unsaturated carboxylic acid (e.g. hydroxyalkyl (meth)acrylate with phosphoric acid or a phosphoric acid ester, or an acrylate or methacrylate containing an urethane bond or siloxane bond; an aromatic hydrocarbon vinyl compound such as styrene, α-methylstrene, chlorostyrene, styrenesulfonic acid or vinyl toluene; an unsaturated carboxylic acid such as maleic acid, fumaric acid or itaconic acid, its salt such as alkali metal salt, ammonium salt or amine salt, and its anhydride such as maleic anhydride; an ester of the unsaturated carboxylic acid, e.g. a diester or half ester of the unsaturated carboxylic acid or anhydride with a linear or branched alcohol having 1 to 20 carbon atoms; a vinyl ester such as vinyl acetate or vinyl propionate; an allyl compound such as diallyl phthalate; an amino group-containing vinyl compound such as vinylpyridine or aminoethyl vinyl ether; an amido group-containing vinyl compound such as itaconic acid diamide, crotonamide, maleic acid diamide, fumaric acid diamide or N-vinylpyrrolidone; a vinyl ether such as methyl vinyl ether or cyclohexyl vinyl ether; vinyl chloride or vinylidene chloride; and other monomers such as chloroprene, propylene, butadiene, isoprene fluoroolefin, maleimide, N-vinylimidazole or vinylsulfonic acid. These monomers may be used alone or in admixture thereof.

The other copolymerizable toohomer A3 is used in an amount of 10 to 90% by weight, especially 30 to 80% by weight, based on the total weight of monomers used.

When a polar monomer having a group such as amino group, carboxyl group, sulfonic acid group or phosphoric acid group is used as the monomer A3, it is preferable to use it in an amount of at most 5% by weight based on the total weight of monomers used in order to minimize occurrence of crosslinking reaction at the time of polymerization.

Segments containing or composed of urethane bonds or siloxane bonds may be introduced into the main chain of the vinyl copolymer (A) in an amount not exceeding 50% by weight of the obtained vinyl copolymer (A) in order to improve the weatherability, solvent resistance and impact resistance of coating films.

The vinyl copolymer (A) can be prepared from the monomers A1, A2 and A3 by various methods, for instance, as known from Japanese Patent Publication Kokai No. 54-36395, No. 58-157810 and No. 01-141952. A solution polymerization method using an azo radical polymerization initiator such as azoisobutyronitrile is particularly preferred from the viewpoint of easiness in synthesis.

Solvents to be used in a solution polymerization for the preparation of the vinyl copolymer (A) are not particularly limited so long as they are non-reactive. Examples of the solvent are, for instance, a hydrocarbon such as toluene, xylene, n-hexane or cyclohexane; an acetic acid ester such as ethyl acetate or butyl acetate; an alcohol such as methanol, ethanol, isopropanol or n-butanol; a cellosolve (ethylene glycol ether) such as ethyl cellosolve or butyl cellosolve; an ether ester compound such as cellosolve acetate; a ketone such as methyl ethyl ketone, ethyl acetoacetate, acetylacetone, diacetone alcohol, methyl isobutyl ketone or acetone; and the like. The solvents may be used alone or in admixture thereof.

It is preferable that the polymerization solvent contains 1 to 30 parts by weight of an alcohol mentioned above such as methanol or butanol based on 100 parts by weight of the whole monomers, since gellation may occur during the polymerization if no alcohol or less than 1 part by weight of an alcohol is included in the solvent.

In the solution polymerization, a chain transfer agent may be used in order to control the molecular weight of the vinyl copolymer (A). Examples of the chain transfer agent are, for instance, n-dodecyl mercaptan, t-dodecyl mercaptan, n-butyl mercaptan, γ-mercaptopropyltrimethoxysilane, γ-mercaptopropyltriethoxysilane, γ-mercaptopropylmethyldimethoxysilane, γ-mercaptopropylmethyldiethoxysilane, (CH$_3$O )$_3$Si—S—S—Si—(OCH$_3$)$_3$, (CH$_3$O)$_3$Si—S$_8$—Si(OCH$_3$)$_3$, and the like. They may be used alone or in admixture thereof. Particularly, when using a chain transfer agent having an alkoxysilyl group in its molecule, such as γ-mercaptopropyltrimethoxysilane, it is possible to introduce an alkoxysilyl group into the vinyl copolymer (A) at the polymer chain end. The amount of the chain transfer agent is usually from 0.1 to 10% by weight based on the total weight of the monomers used.

The thus obtained vinyl copolymers (A) may be used alone or in admixture therof.

From the viewpoints of the thermosetting property of the obtained curable composition and the physical properties such as durability of coating films formed from the composition, the number average molecular weight of the vinyl copolymer (A) is preferably from 1,000 to 30,000, especially from 2,000 to 25,000.

The vinyl copolymer (A) which has both a hydrolyzable silyl group and an alcoholic hydroxyl group in its molecule, is used in combination with a compound (B) having at least one silanol group in its molecule, typically a silanol group-containing organopolysiloxane. Preferably, the number of silanol groups included in the organopolysiloxane (B) is two or more in average in order to more sufficiently exhibit the effect of improving the acid resistance. The silanol group may be —SIR' group wherein R' is an alkoxy group having 1 to 4 carbon atoms, which converts into silanol group by hydrolysis. When the average number of silanol groups in the organopolysiloxane (B) is more than 6, it would render the obtained composition highly viscous. Accordingly, it is preferable that the number of silanol groups is at most 6 in average in order to make it possible to prepare curable compositions having a high solid concentration.

Preferably the number average molecular weight of the organopolysiloxane (B) is from 200 to 3,00, especially from 200 to 2,000. When the number average molecular weight of the compound (B) is less than 200, the compound may be volatile or may be liquid and also the impact resistance tends to be decreased. When the number average molecular weight is more than 3,000, the viscosity of the obtained curable composition is raised, thus the preparation of curable compositions having an increased solid concentration may become difficult.

Examples of the silanol group-containing organopolysiloxane (B) are, for instance, compounds of the following formulas:

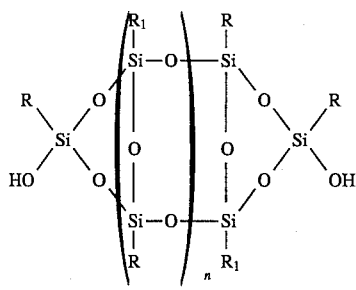

wherein R and $R_1$ are phenyl group, a $C_1$ to $C_4$ alkyl group or hydroxyl group, and n is an integer of 1 to 10,

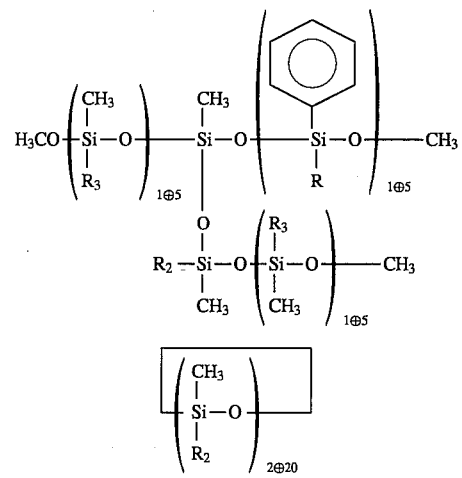

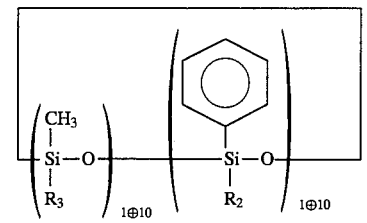

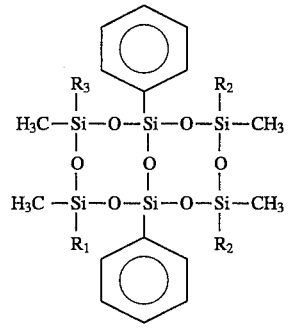

wherein R and $R_1$ are as defined above, and $R_2$ and $R_3$ are hydroxyl group or a $C_1$ to $C_4$ alkoxy group,

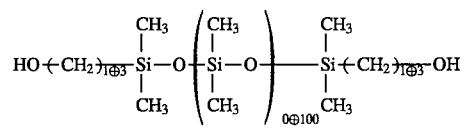

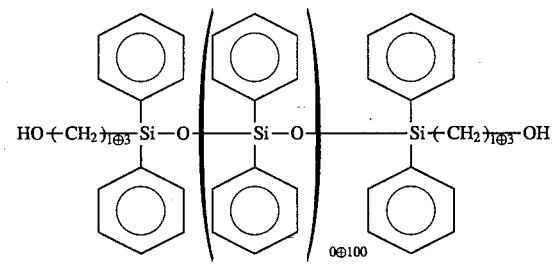

-continued

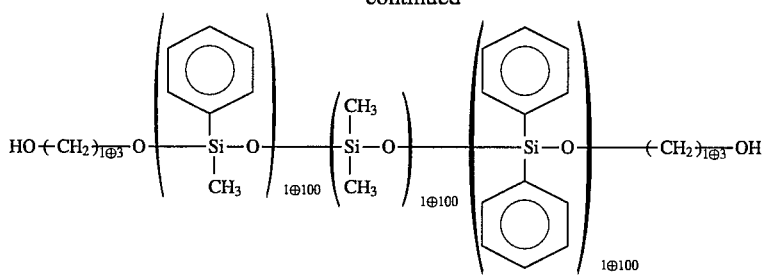

organopolysiloxanes having one or more silanol groups and/or $C_1$ to $C_4$ alkoxy groups wherein the organo group is methyl group, phenyl group or other suitable groups, e.g. polymonomethylsiloxane, polydimethylsiloxane, polymethylphenylsiloxane, polydiphenylsiloxane, commercially available silanol group-containing organopolysiloxanes such as TSR160, YR3168 (which are products of Toshiba Silicone Kabushiki Kaisha), SH6018 (which is a product of Toray Dow Corning Silicone Kabushiki Kaisha), DC6-2230 (which product of Dow Corning Co.), KR-211, KR-212, KR-214 and KR-216 (which are products of Shin-Etsu Chemical Co., Ltd.), and the like. Silanol group-containing phenyl-substituted cyclic organopolysiloxane such as SH6018, DC6-2230 and KR-216 are preferred, since the obtained compositions are superior in curability and provide coating films superior in appearance and solvent resistance.

Examples of the curing catalyst (C) used in the present invention are, for instance, an organotin compound such as dibutyl tin dilaurate, dibutyl tin dimaleate, dioctyl tin dilaurate, dioctyl tin dimaleate or tin octylate; phosphoric acid and a phosphoric acid ester such as monomethyl phosphate, monoethyl phosphate, monobutyl phosphate, monooctyl phosphate, monodecyl phosphate, dimethyl phosphate, diethyl phosphate, dibutyl phosphate, dioctyl phosphate or didecyl phosphate; an addition reaction product of phosphoric acid and/or the acid phosphoric acid ester with an epoxy compound such as propylene oxide, butylene oxide, cyclohexene oxide, glycidyl methacrylate, glycidol, acryl glycidyl ether, γ-glycidoxypropyltrimethoxysilane, γ-glycidoxypropyltriethoxysilane, γ-glycidoxypropylmethyldimethoxysilane,

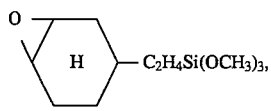

"Cardula E" (which is a product of Yuka Shell Epoxy Kabushiki Kaisha), "Epikote 28", "Epikote 1001" (which are epoxy resins made by Yuka Shell Epoxy Kabushiki Kaisha); an organotitanium compound such as isopropyltriisostealoyl titanate, isopropyltris(dioctylpyrophosphate)titanate or bis(dioctylpyrophosphate)oxyacetate titanate; an organoaluminum compound such as tris(ethylacetoacetato)aluminum or tris(acetylacetonate)aluminum; a saturated or unsaturated polycarboxylic acid and its anhydride such as maleic acid, adipic acid, azelaic acid, sebacic acid, itaconic acid, citric acid, succinic acid, phthalic acid, trimellitic acid or pyromellitic acid; a sulfonic acid such as dodecylbenzenesulfonic acid or p-toluenesulfonic acid; an amine such as hexylamine, di(2-ethylhexyl)amine, N,N-dimethyldodecylamine, dodecylamine, DABCO, DBU, morpholine or diisopropanolamine; diisopropanolamine; a reaction product of an amine with an acid phosphoric acid ester or a sulfonic acid, e.g. NACURE 5225, NACURE 5543 and NACURE 5925 (which are products of Kings Industries); an alkaline compound such as sodium hydroxide or potassium hydroxide; and the like. The catalysts may be used alone or in admixture thereof.

Among these catalysts, there are preferred the organotin compounds, the acid phosphates, the reaction products of the acid phosphate and the amine, the saturated or unsaturated polycarboxylic acids or their anhydrides, the sulfonic acids, the reaction products of the amine with the sulfonic acid, the organotitanium compounds, the organoaluminum compounds, and mixtures thereof, since the catalytic activity is high.

The curable composition suitable for top coat use according to the present invention can be prepared by mixing the vinyl copolymer (A) with the silanol group-containing compound (B) and the curing catalyst (C) in a usual manner to give a uniform composition, using for instance a mixer or an agitator.

The silanol group-containing compound (B) is used in an amount of 1 to 200 parts by weight, preferably 5 to 100 parts by weight, more preferably 5 to 60 parts by weight, per 100 parts by weight of the vinyl copolymer (A). When the amount is less than 1 part by weight, the effect of improving the acid resistance is not sufficiently exhibited. When the amount is more than 200 parts by weight, the flexibility of coating films is lowered.

The curing catalyst (C) is used in an amount of 0.001 to 10 parts by weight, preferably 0.05 to 10 parts by weight, per 100 parts by weight of the vinyl copolymer (A). When the amount of the catalyst (C) is less than 0.001 by weight, the curability of the obtained composition is lowered. When the amount is more than 10 parts by weight, the appearance of coating films is lowered.

When it is desired to lower the viscosity of the curable composition according to the present invention, a tetraalkoxysilane, an alkyltrialkoxysilane, a partial hydrolysis product of these silane compounds, an amino resin such as melamine resin, or a mixture thereof may be incorporated into the composition in an amount of at most 50 parts by weight, preferably at most 30 parts by weight, per 100 parts by weight of the vinyl copolymer (A).

In order to improve the thermosetting property of the curable composition of the present invention and the impact resistance of coating films formed from the curable composition, a hydroxyl group-containing polymer, especially a polymer having two or more hydroxyl groups, such as an acrylic polyol, polycarbonate diol or a polyester diol, may be incorporated into the composition so long as the alcoholic hydroxyl group/hydrolyzable silyl group ratio fails within the range of 0.1/1 to 3/1 by mole.

A dehydrating agent and/or an alcohol as a solvent may be added to the curable composition of the present invention in order to raise the storage stability of the composition.

Representative example of the dehydrating agent is a hydrolyzable ester compound. Examples of the hydrolyzable ester compound are, for instance, methyl orthoformate, ethyl orthoformate, methyl orthoacetate, ethyl orthoacetate, methyl silicate, ethyl silicate and methyltrimethoxysilane. They may be used alone or in admixture thereof.

The dehydrating agent may be added to a polymerization system prior to or during or after the polymerization. The dehydrating agent is usually employed in an amount of 0.5 to 70 parts by weight, preferably at most 50 parts by weight, more preferably at most 20 parts by weight, per 100 parts by weight of the vinyl copolymer (A), since a defect such as foaming (pinholes or craters) tends to be easily formed in coating films when the amount is too much.

An alkyl alcohol having 1 to 10 carbon atoms is used as the alcohol solvent. Examples of the alkyl alcohol are, for instance, methyl alcohol, ethyl alcohol, n-propyl alcohol, isopropyl alcohol, n-butyl alcohol, isobutyl alcohol, sec-butyl alcohol, tert-butyl alcohol, n-amyl alcohol, isoamyl alcohol, hexyl alcohol and octyl alcohol. The alcohol solvents may be used alone or in admixture thereof.

The amount of the alcohol solvent is not particularly limited, but since a defect such as foaming (pinholes or craters) tends to be easily formed when the amount is too much, the alcohol solvent is usually employed in an amount of at most 70 parts by weight, preferably at most 50 parts by weight, more preferably at most 20 parts by weight, per 100 parts by weight of the vinyl copolymer (A). When the alcohol solvent is used alone without using the dehydrating agent, it is preferable that the alcohol solvent is present in the curable composition in an amount of 0.5 to 70 parts by weight, especially 1 to 50 parts by weight, more preferably 2 to 20 parts by weight, per 100 parts by weight of the vinyl copolymer (A).

The storage stability of the curable composition containing the vinyl copolymer (A) and the silanol group-containing compound (B) is remarkably improved by combination use of the dehydrating agent and the alcohol solvent. The total amount of the dehydrating agent and the alcohol solvent is suitably selected in consideration of the molecular weights and compositions of the components (A) and (B) so as to provide the obtained curable composition with solid concentration and viscosity necessary for practical use.

The curable composition of the present invention is suitable as top coats, and may contain various additives which have been generally used in paints.

The weatherability of the curable composition of the present invention can be improved by incorporating a ultraviolet absorber or a light stabilizer, especially a combination thereof. Known ultraviolet absorbers and light stabilizers can be used. Examples of the ultraviolet absorbers are, for instance, benzophenone, triazole, phenylsalicylate, diphenyl acrylate and acetophenone UV, absorbers. They may be used alone or in admixture thereof. Examples of the light stabilizer are, for instance, bis(2,2,6,6-tetramethyl-4-piperidyl) sebacate, bis(1,2,2,6,6-pentamethyl-4-piperidyl) sebacate, bis(1,2,2,6,6-pentamethyl-4-piperidyl)2-(3, 5-di-tertbutyl-4-hydroxybenzyl)-2-n-butylmalonate, tetrakis(2,2,6, 6-tetramethyl-4-piperidyl)-1,2,3,4,-butanetetracarboxylate, and tetrakis(1,2,2,6,6-pentamethyl-4-piperidyl)-1,2,3, 4butanetetracarboxylate. The light stabilizers may be used alone or in admixture therof. The ultraviolet absorber is used in an amount of 0.1 to 10 parts by weight, preferably 1 to 5 parts by weight, based on 100 parts by weight of the solid matter of the composition. The light stabilizer is used in an amount of 0.1 to 10 parts by weight, preferably 1 to 5 parts by weight, based on 100 parts by weight of the solid matter of the composition.

When the top coating composition according to the present invention is used as a clear paint for top coating, the composition can be incorporated suitably according to the uses thereof with additives such as a diluent, an agent for preventing cissing and a leveling agent; a cellulose derivative such as nitrocellulose or cellulose acetate butyrate; a resin such as epoxy resin, melamine resin, vinyl chloride resin, chlorinated polypropylene resin, chlorinated rubber or polyvinyl butyral; and the like.

The composition of the present invention is low toxic. A high solid concentration of from 50 to 70% by weight can be attained.

Cured coating films having excellent properties, e.g. a chemical resistance such as acid resistance, water resistance, weatherability, abrasion or scratch resistance and appearance, can be obtained from composition of the present invention by applying the composition to a substrate in a manner such as spraying, brush coating, roll-coating or dipping, and then curing the coating film at a temperature of about 80° to about 160° C.

The curable composition of the present invention has an improved excellent acid resistance as well as excellent properties such as water resistance, abrasion resistance, scratch resistance, weatherability, appearance and thermosetting property and, therefore, is suitably used as a top coat paint for automobiles, industrial equipments, steel furnitures, interior and exterior of building, household electric appliances, plastic goods, particularly as a top coat print for automobiles.

The present invention is more specifically described and explained by means of the following Examples in which all % and parts are by weight unless otherwise noted. It is to be understood that the present invention is not limited to these Examples.

Reference Example

[Preparation of vinyl copolymer (A)]

A reactor equipped with a stirrer, a thermometer, a reflux condenser, a tube for introducing nitrogen gas and a dropping funnel was charged with 26 parts of an aromatic petroleum naphtha (commercially available under the trade mark "Solvesso" 100 made by Exxon Chemical Co.), and the reactor was heated to 110° C. with introducing nitrogen gas thereto. A mixture of 100 parts of the monomer mixture shown in Table 1, 4.75 parts of 2,2'-azobisisobutyronitrile, 3.5 parts of Solvesso 100 and 2 parts of methanol was added dropwise to the reactor at a constant rate through the dropping funnel over 4 hours.

After the completion of the addition, a solution of 0.25 part of 2,2'-azobisisobutyronitrile in 10 parts of xylene was added dropwise to the reactor at a constant rate over 30 minutes. The polymerization was further conducted at 110° C. for 1.5 hours, and it was then cooled. To the reaction mixture were added 4 parts of methyl orthoacetate and 4 parts of methanol, and the reaction mixture was then diluted with Solvesso 100 to give a solution of vinyl copolymer (A) having a solid concentration of 60%.

The number average molecular weight, hydrolyzable silyl equivalent (g), alcoholic hydroxyl equivalent (g) and molar ratio of alcoholic hydroxyl group to hydrolyzable silyl group of the obtained vinyl copolymers (a) to (g) are shown in Table 1, wherein the vinyl copolymers (f) and (g) are for comparison and the abbreviations show the following compounds. MPTMSi: γ-Methacryloyloxypropyltrimethoxysilane HPA: 2-Hydroxypropyl acrylate HEMA: 2-Hydroxyethyl methacrylate HEA: 2-Hydroryethyl acrylate St: Styrene MMA: Methyl methacrylate NBA: n-Butyl acrylate

TABLE 1

| | Monomers (part) | | | | | | | | Vinyl coloymer A | | | |
| | Monomer A1 | Monomer A2 | | | | | Monomer A3 | | Number average M.W. | Hydrolyzable silyl equivalent (g) | Alcoholic hydroxyl equivalent (g) | Molar ratio of OH/silyl group |
| No. | MPTMSi | Placcel FM-1* | HPA | HEMA | HEA | St | MMA | NBA | | | | |
|---|---|---|---|---|---|---|---|---|---|---|---|---|
| a | 20 | — | 13.3 | — | — | 15 | 30 | 21.7 | 4100 | 1240 | 977 | 1.27 |
| b | 20 | — | — | 13.3 | — | 15 | 27.2 | 24.5 | 3900 | 1240 | 977 | 1.27 |
| c | 20 | — | — | — | 11.9 | 15 | 30 | 23.1 | 4000 | 1240 | 975 | 1.27 |
| d | 20 | 16.5 | — | — | — | 15 | 31.8 | 16.7 | 4200 | 1240 | 1479 | 0.84 |
| e | 20 | — | — | 8.8 | — | 15 | 30 | 26.2 | 4000 | 1240 | 1477 | 0.84 |
| f | 10 | — | — | 34.6 | — | 15 | 16.2 | 24.2 | 4400 | 2480 | 376 | 6.6 |
| g | 20 | — | 3 | — | — | 15 | 29.8 | 32.2 | 4100 | 1240 | 4333 | 0.29 |

(Note) *1 ε-Caprolactone-modified hydroxyalkyl methacrylate made by Daicel Chemical Industries, Ltd.

Examples 1 to 9 and Comparative Examples 1 to 5

To the solution of a vinyl copolymer (A) obtained in Reference Example was added a silanol group-containing organopolysiloxane having 6 silanol groups in average in one molecule and a number average molecular weight of 1,600 (commercially available under the trade mark "SH6018" from Toray Dow Corning Silicone Kabushiki Kaisha) or a silanol group-containing linear organopolysiloxane having 2.5 silanol groups in average in one molecule and a number average molecular weight of about 2,000 (commercially available under the trade mark "KR212" from Shin-Etsu Chemical Co., Ltd.) as the component (B) in an amount shown in Table 2 per 100 parts of the solid matter of the vinyl copolymer solution. To the resulting mixture were then added 0.4% of a leveling agent (commercially available under the trade mark "DISLON" L-1984-50 in U.S.A. and "DISPARLON" L-1984-50 in other countries from Kusumoto Kasei Kabushiki Kaisha) and 1% of a mixture of dodecylbenzenesulfonate and diisopropanolamine (equivalent ratio of dodecylbenzenesulfonate/diisopropanolamine=1/1.03) as the curing catalyst (C) based on the solid polymer. The mixture was diluted with Solvesso 100 so that the viscosity measured by Ford viscosity cup No. 4 fell within the range of 23 to 27 seconds, to give a clear paint for top coating.

In Comparative Example 5, 100 parts of a commercially available acrylic melamine resin was used instead of a mixture of the vinyl copolymer (A) and the organopolysiloxane (B).

The gel fraction (%) and the retention (%) of water resisting gel fraction of coating films were measured according to the following methods with respect to the obtained clear paints. The results are shown in Table 2.

(a) Gel fraction

A clear film obtained by coating and backing a clear top coating paint at 140° C. for 30 minutes was cut in half and a piece was wrapped with a 200 mesh stainless steel wire net having a weight $W_0$. The weight ($W_1$) of the whole was measured exactly. The wrapped film was then dipped in acetone for 24 hours for extraction and dried, and the weight ($W_2$) after the extraction treatment was measured. The gel fraction of the cured coating film was calculated according to the following equation.

$$\text{Gel fraction (\%)} = \frac{W_2 - W_o}{W_1 - W_o} \times 100$$

(b) Retention of water resisting gel fraction

Another piece of the clear film cured at 140° C. for 30 minutes was wrapped with a 200 mesh stainless steel wire net having a weight $W'_0$. The weight ($W'_1$) of the wrapped film was measured exactly. The wrapped film was dipped in hot water at 80° C. for 24 hours, and was then dipped in acetone at room temperature for 24 hours for extraction. After drying the film, the weight ($W'_2$) of the treated film was measured. The water resisting gel fraction (%) was calculated according to the following equation.

$$\text{Water resisting gel fraction (\%)} = \frac{W'_2 - W'_o}{W'_1 - W'_o} \times 100$$

The retention (%) of water resisting gel fraction was calculated according to the following equation by using the gel fraction (%) measured previously with respect to the same film.

Retention of water resisting gel fraction (%) =

$$\frac{\text{Water resisting gel fraction}}{\text{Gel fraction}} \times 100$$

A mild steel plate which was previously degreased and subjected to a phosphatizing treatment was coated with an automobile epoxy amide cationic electroprimer and then with an intermediate surfacer to give a substrate for testing. A commercially available acrylic melamine resin paint (black) was coated as a base coat onto the substrate. Subsequently the above-mentioned clear top coating paint was applied onto the black base coating in a wet-on-wet manner, and after setting for 10 minutes, the coated substrate was baked at 140° C. for 30 minutes. The dry thickness of the base coat was about 15 μm and the dry thickness of the clear top coat was from about 30 to about 40 μm.

With respect to the obtained coating films, the acid resistance, scratch resistance and appearance were measured according to the following methods.

(c) Acid resistance

Four drops of a 40% aqueous solution of sulfuric acid were fell onto the coating by using a pipette, and the coating was heated at 70° C. for 30 minutes. The sulfuric acid solution was rinsed with water, and the change of the coating surface was visually observed and estimated according to the following rating. (Rating)

10: There is no change as compared with the coating before dropping.
9: A slight change is observed.
8: Circular marks are observed.
7: Discoloration and blister are slightly observed.
6: Lowering of gloss and discoloration are slightly observed.
5: Lowering of gloss and discoloration are clearly observed.
4: Slight shrinking and clear blistering are observed.
3: Slight lifting, marked shrinking and discoloration are observed.
2: Lifting of coating is clearly observed.
1: Disolution of coating is observed.

(d) Scratch resistance

A coated specimen was horizontally fixed, and an abrasive (a mixture of 1.2% of dust for Industrial Testing No. 8 provided by Japan Association of Powder Process Industry & Engineering, 1.2% of dust for Industrial Testing No. 11 provided by the same as above, 0.6% of kaolin, 1.0% of a neutral detergent and 96% of water) was applied thereon in an amount of about 0.05 g/cm². A weight (diameter of contact surface: 5 cm, load: 22 g/cm²) covered with a kraft paper was stroked against the surface of the coating film.

The 20° gloss of the film surface was measured by a colour difference glossimeter (Kabushiki Kaisha Murakami Shikisai Gijutsu Kenkyusho) before stroke and after 20 strokes. The scratch resistance was evaluated by the gloss retention (%) after 20 strokes calculated according to the following equation. The larger the gloss retention, the better the scratch resistance.

$$\text{Gloss retention} = \frac{\text{Gloss after stroke}}{\text{Gloss before stroke}} \times 100$$

(e) Appearance

The sharpness of a coating film was measured by using an image clarity measuring device (model ICM-1-DP made by Suga Shikenki Kabushiki Kaisha, width of slit 0.5 mm). The larger the value of sharpness, the better the appearance.

From the results shown in Table 2, it is understood that coating films formed from the coating compositions obtained in Examples 1 to 9 have a high retention of water resisting gel fraction, a high retention of gloss, a high water resistance, a high scratch resistance and an excellent appearance, and moreover they do not show any change in surface condition even if an acid is applied thereto, thus having an excellent acid resistance.

In addition to the ingredients used in the Examples, other ingredients can be used in the Examples as set forth the specification to obtain substantially the same results.

What we claim is:

1. A curable composition suitable as a top coat which comprises:
   (A) a vinyl copolymer having a main chain consisting essentially of a vinyl copolymer and having in its molecule both at least one alcoholic hydroxyl group and at least one hydrolyzable silyl group, bonded to a carbon atom, of the formula (I):

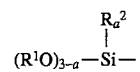

wherein $R^1$ is an alkyl group having 1 to 10 carbon atoms or an aryl group, $R^2$ is hydrogen atom or a monovalent hydrocarbon group selected from the group consisting of an alkyl group having 1 to 10 carbon atoms, an aryl group and an aralkyl group, and a is 0, 1 or 2, said copolymer having an alcoholic hydroxyl equivalent of 400 to 2,000 g where said alcoholic hydroxyl equivalent is the weight of said copolymer containing one gram equivalent of an alcoholic hydroxyl group,
   (B) 1 to 200 parts of a silanol group-containing organopolysiloxane having at least one silanol group, and
   (C) 0.001 to 10 parts of a curing catalyst, said parts of (B) and (C) being parts by weight per 100 parts by weight of said vinyl copolymer (A).

TABLE 2

| | Composition (part) | | Properties | | | | |
| | | | Gel fraction (%) | Retention of water resisting gel fraction (%) | Acid resistance | Scratch resistance (gloss retention %) | Apearance (Sharpness) |
| | Vinyl copolymer (A) | Silanol group containing compound (B) | | | | | |
|---|---|---|---|---|---|---|---|
| Ex. 1 | a (100) | SH6018 (30) | 95 | 96 | 10 | 70 | 92 |
| Ex. 2 | b (100) | SH6018 (30) | 97 | 95 | 10 | 71 | 91 |
| Ex. 3 | c (100) | SH6018 (50) | 97 | 92 | 10 | 69 | 93 |
| Ex. 4 | d (100) | SH6018 (30) | 96 | 92 | 10 | 75 | 90 |
| Ex. 5 | e (100) | SH6018 (20) | 95 | 93 | 10 | 74 | 89 |
| Ex. 6 | a (100) | SH6018 (10) | 95 | 92 | 10 | 75 | 93 |
| Ex. 7 | e (100) | SH6018 (5) | 94 | 93 | 10 | 72 | 90 |
| Ex. 8 | a (100) | KR212 (30) | 94 | 94 | 10 | 73 | 92 |
| Ex. 9 | e (100) | KR212 (10) | 96 | 93 | 10 | 75 | 91 |
| Com. Ex. 1 | a (100) | — | 97 | 95 | 7 | 71 | 85 |
| Com. Ex. 2 | d (100) | — | 97 | 90 | 4 | 76 | 83 |
| Com. Ex. 3 | f (100) | SH6018 (30) | 85 | 80 | 6 | 60 | 90 |
| Com. Ex. 4 | g (100) | SH6018 (30) | 89 | 94 | 10 | 48 | 89 |
| Com. Ex. 5 | — | — | 96 | 88 | 1 | 60 | 91 |

2. The composition of claim 1, wherein said vinyl copolymer (A) has a hydrolyzable silyl equivalent of 380 to 30,000 g, where said hydrolyzable silyl equivalent is the weight of said vinyl copolymer (A) containing one gram equivalent of a hydrolyzable silyl group.

3. The composition of claim 1, wherein the ratio of alcoholic hydroxyl group to hydrolyzable silyl group in said vinyl copolymer (A) is from 0.1/1 to 3/1 by mole.

4. The composition of claim 1, wherein said vinyl copolymer (A) is a copolymer prepared from a monomer mixture containing 2-hydroxypropyl, acrylate or methacrylate.

5. The composition of claim 1, wherein said vinyl copolymer (A) is a copolymer of a hydrolyzable silyl group-containing vinyl monomer, an alcoholic hydroxyl group-containing vinyl monomer and other vinyl monomers copolymerizable therewith.

6. The composition of claim 5, wherein said alcoholic hydroxyl group-containing vinyl monomer is an acrylic monomer.

7. The composition of claim 1, wherein said silanol group-containing organopolysiloxane (B) has 2 to 6 silanol groups in average in its molecule.

8. The composition of claim 1, wherein said silanol group-containing organopolysiloxane (B) has a number average molecular weight of 200 to 3,000.

9. The composition of claim 1, wherein said silanol group-containing organopolysiloxane (B) is a compound of the formula:

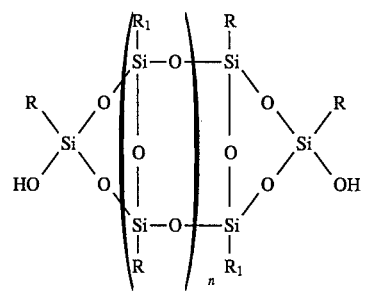

wherein R and $R_1$ are phenyl group, a $C_1$ to $C_4$ alkyl group or hydroxyl group, and n is an integer of 1 to 10.

10. The composition of claim 1, wherein said component (B) is an organopolysiloxane having at least one of hydroxyl and $C_1$ to $C_4$ alkoxy groups bonded to a silicon atom wherein the organo group is at least one of methyl group or phenyl group.

11. The composition of claim 1, wherein said component (B) is a silanol group-containing phenyl-substituted cyclic organopolysiloxane.

12. The composition of claim 1, which contains a hydroxy group-containing polymer provided that the ratio of the alcoholic hydroxyl group to the hydrolyzable silyl group in the system falls within the range of 0.1/1 to 3/1 by mole.

13. The composition of claim 1, which contains 0.5 to 70 parts by weight of at least one of a hydrolyzable ester compound or an alkyl alcohol having 1 to 10 carbon atoms based on 100 parts by weight of said vinyl copolymer (A).

* * * * *